United States Patent Office 3,729,512
Patented Apr. 24, 1973

3,729,512
HOMOGENEOUS RUTHENIUM-CATALYZED
REDUCTION OF NITRO COMPOUNDS
Francois L'Eplattenier and Fausto Calderazzo, Geneva, Switzerland, assignors to American Cyanamid Company, Stamford, Conn.
No Drawing. Filed Nov. 27, 1968, Ser. No. 779,648
Int. Cl. C07c 85/10
U.S. Cl. 260—580   6 Claims

ABSTRACT OF THE DISCLOSURE

A catalytic process for the reduction of nitro compounds to the corresponding amines is described. The process uses for the reduction a mixture of carbon monoxide and hydrogen and as catalysts ruthenium carbonyls or compounds which are transformed into ruthenium carbonyls in the reaction, such as tris(acetylacetonato) ruthenium. The reactions are, in general, strongly exothermic, and additional solvents, such as benzine, are desirable. Good yields of the amines are obtained and the operation is carried out at moderate temperatures, from 130° to 160° C. under moderate pressure, for example 200 to 300 atmospheres.

BACKGROUND OF THE INVENTION

Many nitro compounds, such as for example nitrobenzene, have been reduced catalytically to the corresponding amines, such as aniline, with reducing gases such as hydrogen in the presence of catalysts mainly heterogeneous catalysts. For the most part, homogeneous catalytic systems for the reduction of the nitro compounds are not known. It has also been proposed to reduce nitrobenzene with cobalt carbonyl as a catalyst, and another process used alkaline solutions of pentacarbonyl iron. In the latter process the amount of the pentacarbonyl is so large that it is not really a catalytic reaction but a general chemical reaction in which the iron complex acts as the reducing agent.

SUMMARY OF THE INVENTION

The present invention is directed to a homogeneous catalytic reduction of nitro compounds, typically of nitrobenzene to aniline. In the invention a reducing gas is used consisting of carbon monoxide and hydrogen, for example in substantially equimolecular mixture, using as a catalyst a ruthenium carbonyl such as dodecarbonyl triruthenium; ruthenium pentacarbonyl; bis(acetylacetonato) dicarbonyl ruthenium(II); $Ru(CO)_4P(C_6H_5)_3$; $Ru(CO)_3(P(C_6H_5)_3)_2$; $[RuC_5H_5(CO)_2]_2$; $RuC_8H_8(CO)_3$. One preferred catalyst is the dodecacarbonyl triruthenium. Also, a ruthenium compound which under the conditions of the reaction is transformed into a ruthenium carbonyl, can be used. Examples are tris(acetylacetonato) ruthenium, bis(acetylacetonato) bis(triphenylphosphine)ruthenium, $Ru(C_5H_5)_2$, and ruthenium(III) acetates.

The process of the present invention is a true catalytic process as the catalyst is present, catalytically active, in very small amounts compared to the amounts of the reactants. The ruthenium compound may be recovered for reuse either in the form in which it was initially used or, if it is a compound which is transformed into a ruthenium carbonyl, the compound formed. It should be noted that the nature of the reducing gas is of very real importance because unless there is a substantial proportion of carbon monoxide, the catalyst is not regenerated. For example, if hydrogen is used alone as the reducing gas, the catalyst is reduced to metallic ruthenium, which cannot be reused without reforming the carbonyl. Also, when hydrogen is used as the only reducing agent, more byproducts are produced, for example in the case of nitrobenzene, cyclohexane and cyclohexylamine. When the preferred ruthenium dodecacarbonyl catalyst is used with a reducing gas approximating an equi-molar mixture of carbon monoxide and hydrogen, the catalyst is not destroyed and can be reused. In the case of nitrobenzene with the preferred catalyst and the carbon monoxide and hydrogen ratio above referred to, substantially only aniline is produced with small amounts of diphenyl urea, which can be easily separated and present no significant operating problems.

When the ruthenium compound is not initially a ruthenium carbonyl the reaction is somewhat slower and the need of additional solvents is, therefore, less critical since the exotherm of the reaction is generated more gradually. The solvent which is used in the case of the ruthenium carbonyl catalysts can be substantially any inert solvent and its exact chemical nature is, therefore, of little significance. Benzene is an excellent solvent but other solvents may be used. Typical hydrocarbon solvents are toluene, xylene, heptane, and the like.

The process of the present invention is applicable to the reduction of any organic nitro compound which is capable of forming amines. Typical of such other compounds are 2-nitropropane; N,N-dipropionamido-4-nitrobenzamide; 2,4- dinitrotoluene, and tris(p-nitrophenyl) amine.

It is an advantage of the present invention that neither temperature nor pressure is critical, nor for that matter is the exact ratio of carbon monoxide and hydrogen. The temperature can advantageously be somewhere between 130° and 160°, but these limits are not rigid and somewhat higher temperatures may be used. Temperatures down to 100° C. are not inoperative but the reaction becomes quite slow at the lower temperatures and, therefore, it is desirable from the economic standpoint to operate at somewhat higher temperatures nearer the top of the preferred range. The proportion of carbon monoxide and hydrogen can advantageously be substantially equimolecular as this is usually the form in which such a gas is produced by the water gas process. However, the proportions are not at all crtical, except of course that, as has been pointed out above, there should be sufficient carbon monoxide present so that the ruthenium carbonyl catalyst is not converted to ruthenium metal. A large partial pressure of hydrogen relative to carbon monoxide minimizes the formation of diphenylurea as a byproduct. Fairly high pressures speed up the reaction the range of pressures, however, is in no sense critical, a very suitable range being from 100 to 300 atmospheres.

The amount of the ruthenium catalyst is also not critical, but it is, of course, small. In general, the mol ratio of the nitro compounds to ruthenium should be large. Suitable excesses, are from 20 to as much as 900 moles of nitro compound per atom of ruthenium in the catalyst. In general, when the excess of the nitro compound is small it is desirable to dilute the reaction mixture with solvents, such as benzene, in order to moderate the temperature rise due to the strong exotherm of the reaction. Too high temperatures can cause the reaction to produce charcoal-like products and so should be avoided. With excesses of the nitro compound, such as nitrobenzene, over ruthenium atoms in the catalyst in excess of 100, and particularly in excess of 400, the exotherm is readily controlled without additional diluting solvents. However, even with larger ratios other solvents may be used; but in general, unless needed to control exotherm, they are not preferred since they only reduce the output per unit of equipment.

As with many catalytic reactions, exact reaction mechanisms are difficult to prove, and of course are more or less matters of indifference as it is the overall result of the process with which one is concerned in practical operation. However, it seems probably that the reaction proceeds in stages and quite probably, in the case of nitrobenzene, may first form phenyl nitrene, which can be postulated as occurring as a result of reduction of nitrobenzene with carbon monoxide. This intermediate then can react with hydrogen or carbon monoxide, in the former case producing aniline and in the latter case phenylisocyanate, which can react with some of the aniline to produce diphenylurea, which is sometimes found as a by-product of the reaction. The following reaction scheme, in the case of nitrobenzene, is therefore offered as a probable reaction mechanism. However, it should be understood that we do not know that this is the exact reaction mechanism and that, therefore, in this modification the invention is not intended to be limited thereto.

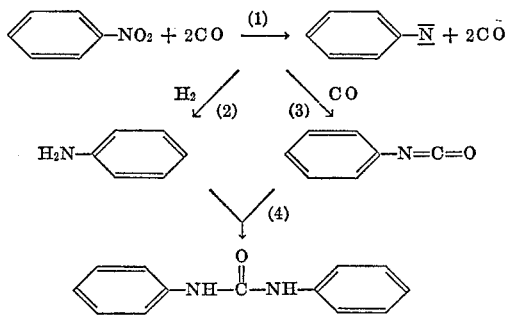

As far as the production of aniline is concerned, the overall stoichiometry of the reaction may be expressed as follows:

If the reducing gas is hydrogen or hydrogen with only a very little carbon monoxide, contamination of the product with cyclohexane or cyclohexylamine can and does take place. Of course cyclohexane is formed only where there is benzene as an additional solvent. Obviously, of course, if the solvent is toluene or a xylene the corresponding methyl substituted cyclohexanes are produced.

It will be seen that the presence of substantial proportion of carbon monoxide is necessary. However, carbon monoxide alone is also not useful. In the case of reduction of nitrobenzene a series of experiments were performed and will be described in more detail in the specific examples, but the results may be briefly summarized here. With hydrogen-carbon monoxide ratios of 1:3 or less, increasing amounts of diphenylurea are formed. With hydrogen to carbon monoxide ratio of 1:7, the proportions of diphenylurea and aniline are about equal; and when there is no hydrogen, unreacted nitrobenzene and pure diphenylurea are produced. The results are not quite so bad when the reaction mixture is diluted with about twice as much ethanol as nitrobenzene. From these experiments it is apparent that it is undesirable to operate with too low ratios of hydrogen to carbon monoxide. Since the water gas process produces approximately equimolecular ratios and is the cheapest source, this is preferred as it gives good results and is cheap. There is, however, no necessity for an exact ratio and it can vary over quite wide ranges.

The experiments above referred to indicate that the last stage of the reduction of the nitro compound requires the presence of substantial amounts of hydrogen. Also, the indication is that the catalyst itself may well form transiently a compound which contains hydrogen as well as carbonyl attached to the ruthenium atom or atoms. Such hydrogen carbonyl complexes of ruthenium are not unknown. Of course it is not practical to determine in the experiment whether at any stage such a hydrogen ruthenium carbonyl form of the catalyst exists. It appears to be transient if it exists at all and so cannot be recovered in such form from the reaction mixture. However, the fact that some hydrogen is needed in the reaction makes it quite possible and even likely that at some stage in the reaction the catalyst is not an unsubstituted ruthenium carbonyl. Accordingly, throughout the remainder of this specification and the claims, when ruthenium carbonyls are referred to it should be understood that this is not intended to limit them to compounds that contain only ruthenium and carbonyl or to exclude the existence in some stage of the reaction of a form of catalyst that may have hydrogen.

DESCRIPTION OF THE PREFERRED EMBODIMENTS

The invention will be described in greater detail in connection with the following typical examples, in which the proportions are in general given in parts by weight or moles except where otherwise noted, as for example in connection with the amounts of added solvent.

Example 1

0.623 gram (0.974 mmole) of $Ru_3(CO)_{12}$ was dissolved in 100 ml. of benzene. 7.23 grams (59 mmoles) of freshly distilled nitrobenzene was then added to the solution. This gave a ratio of moles of nitrobenzene to atoms of ruthenium of 20.2. The reaction mixture was introduced into a rocking stainless steel autoclave having a free volume of about 95 ml., and an equimolecular carbon monoxide-hydrogen atmosphere was then pumped into the autoclave until a pressure of substantially 160 atmospheres resulted; this corresponds to about 330 mmoles of CO. The autoclave was then heated to 160° C. and maintained at this temperature for about 15 hours.

After the reaction was substantially completed, the autoclave was cooled to room temperature and the gases vented. A red-brown reaction mixture remained in the autoclave and was filtered in order to separate some colorless crystals. The crystals, after recrystallization from diethyl ether, were identified by infrared spectrum and melting point as 2,2'-diphenylurea. The amount was 0.62 gram, which corresponded to approximately 10% yield. The infrared spectrum of the filtrate showed a somewhat different spcetrum in the carbonyl stretching region from that of the same solution before reaction with the carbon monoxide and hydrogen. Two intense bands were observed between 2070 and 2000 cm.$^{-1}$, probably due to the transformation of some of the trimeric ruthenium carbonyl to pentacarbonyl ruthenium. The absorption bands of nitrobenzene disappeared almost completely and were replaced by those of aniline. There was also present a band corresponding to the dissolved carbon dioxide produced in the reaction and several other weak bands of one or another unidentified by-products which were present in very small amounts. The amount of aniline (3.65 grams), corresponded to about 67% yield and can be transformed into spectroscopically pure aniline by distillation from the reaction mixture. The ruthenium carbonyl catalyst was recovered and reused.

Example 2

1.108 grams (2.78 mmoles) of tris(acetylacetonato) ruthenium(III) were dissolved in 30.12 grams of nitrobenzene (245 mmoles). This resulted in a ratio of nitrobenzene to ruthenium of 88. The mixture was introduced into an autoclave as described in Example 1 but having a free volume of about 175 ml. and an equimolecular carbon monoxide-hydrogen gas pumped in to a pressure of 200 atmospheres. About 730 mmoles of CO were present. The autoclave was then heated up at 160° C. for about the same time as in Example 1.

After cooling, the reaction mixture was filtered, the residue washed with petroleum ether, and dried. This residue was about 0.46 gram, and infrared spectrum indicated that the solid was $Ru_3(CO)_{12}$ contaminated with some diphenylurea. As in Example 1, no bands corresponding to unreacted nitrobenzene were observed in the infrared spectrum of the filtrate, and when the latter was distilled under vacuum, it gave a main fraction of 15.12 grams (66% yield) of almost pure aniline, as shown by infrared analysis.

Similar results were obtained in a reaction time of about 7 hrs. using a nitrobenzene:ruthenium ratio of about 120.

Example 3

The 0.46 gram of ruthenium catalyst (0.72 mmoles calculated as pure $Ru_3(CO)_{12}$) contaminated with diphenylurea which was obtained in the foregoing example was dissolved in 30.13 grams (245 mmoles) of nitrobenzene. A ratio of nitrobenzene to ruthenium of 113 resulted. This was filled into an autoclave and an equimolecular mixture of carbon monoxide and hydrogen introduced at 200 atmospheres as described in Example 2. The mixture was then heated for 3 hours at 160° C. and then the reaction aws interrupted as no more gas absorption was detectable. After cooling down and filtering, some diphenylurea and some $Ru_3(CO)_{12}$ was isolated. This corresponding to 1.0 gram, calculated as pure diphenylurea or about 4% yield. The filtrate was yellow-brown and had the infrared spectrum of almost pure aniline. The weight was 19.95 grams, corresponding to 87% yield. No unreacted nitrobenzene was observed.

Example 4

0.258 gram (0.404 mmole) of $Ru_3(CO)_{12}$ were dissolved in 60.2 grams of nitrobenzene (489 mmoles) giving a nitrobenzene-ruthenium ratio of 403. This was introduced into an autoclave and an equimolecular atmosphere of hydrogen and carbon monoxide introduced at a pressure of 200 atmospheres, (about 624 mmoles of carbon monoxide). The autoclave was heated to 140°–160° for 6 hours. After cooling, a pressure drop of 140 atmospheres was observed; the pressure was restored to the original value, and the autoclave heated to 160° C. for 1 hour. The reaction mixture was filtered, giving approximately 0.1 gram of $Ru_3(CO)_{12}$, and 30.3 grams of substantially pure aniline were recovered, representing a 66% yield.

Similar results were obtained over longer reaction times when a nitrobenzene:ruthenium ratio of about 900 was used.

Example 5

0.168 gram of $Ru_3(CO)_{12}$, (0.263 mmoles), was dissolved in 50 ml. of benzene and 3.61 grams (29 mmoles) of freshly distilled nitrobenzene added. This gave a ratio of nitrobenzene to ruthenium of 37. The reaction mixture was heated with hydrogen at 140 atmospheres at 160° C. After about 4 hours the pressure had dropped substantially to zero. The solution was cooled down and filtered, giving a colorless filtrate and a black residue which appeared to be primarily ruthenium metal. The filtrate was distilled and a first fraction containing benzene and water obtained, with a second one a mixture of benzene and cyclohexane. Infrared analysis of the distillation residue showed the presence of some aniline and cyclohexylamine.

Example 6

7.22 grams, (58.6 mmoles), of nitrobenzene and 100 ml. of benzene were introduced into a stainless steel autoclave as described in the preceding examples together with 0.57 gram (2.91 mmoles) of $Fe(CO)_5$, giving a ratio of nitrobenzene to iron of 20. This was reacted by heating in the autoclave at 160° C. for 15 hours. Hydrogen and carbon monoxide 1:1 were pumped into the autoclave up to 160 atmospheres. The autoclave was then cooled and the reaction mixture examined, which contained large amounts of unreacted nitrobenzene and only small amounts of aniline detectable by infrared. This example shows that under the same conditions iron carbonyl does not produce significant amounts of reaction as compared to the ruthenium carbonyl catalysts of the preceding examples.

Example 7

60.2 grams (0.5 mole) of nitrobenzene was reacted in an autoclave as described in Example 5 with an equimolecular carbon monoxide-hydrogen mixture introduced at 200 atmospheres, the heating of the autoclave being to 160° C. for 8 hours. No ruthenium catalyst was present. There was practically no gas absorption, and infrared analysis of the reaction mixture indicated the presence of large amounts of unreacted nitrobenzene with only very small quantities of aniline.

The following table summarizes the results of Examples 1 to 7:

| Ex. | Ruthenium compound | Ratio nitrobenzene: metal | Solvent | Temp. (° C.)/ time (hr.) | $P_{CO}$ (atm.) | $P_{H_2}$ (atm.) | Aniline yield, percent | Diphenylurea yield, percent |
|---|---|---|---|---|---|---|---|---|
| 1 | $Ru_3(CO)_{12}$ | 20.2 | Benzene | 160/15 | 80 | 80 | 67 | 10 |
| 2 | $Ru(acac)_3$ | 88 | | 160/15 | 100 | 100 | 66 | |
| 3 | $Ru_3(CO)_{12}$ | 113 | | 160/3 | 100 | 100 | 87 | 4 |
| 4 | $Ru_3(CO)_{12}$ | 403 | | 160/6 | 100 | 100 | 66 | |
| 5 | $Ru_3(CO)_{12}$ | 37 | Benzene | 160/4 | | 140 | | |

It will be noted that in Example 5 the ruthenium carbonyl catalyst was decomposed to ruthenium metal and in this example there were also significant amounts of cyclohexane and cyclohexylamine produced.

It is interesting also to note that in Examples 3 and 4 there were no appreciable quantities of diphenylurea in spite of the large quantity of nitrobenzene, particularly in Example 4. This is strong evidence that the carbon monoxide is used for the formation of the nitrene and that reaction 3, which leads to the formation of diphenyluurea, is minimized in comparison to reaction 2.

Example 8

$Ru_3(CO)_{12}$ (0.193 g.; 0.302 mmole) was dissolved in 30.10 g. nitrobenzene (244 mmoles, ratio nitrobenzene:ruthenium=269) and reacted with 40 atm. $H_2$ (ca. 290 mmoles) and 120 atm. CO (ca. 873 mmoles). This represents a hydrogen to CO ratio of 1:3. The reaction time was 3.5 hrs. at 160° C. After cooling a pressure drop of 75 atm. was observed. The red-brown reaction mixture was filtered. The white residue on the filter, after washing with diethyl ether and drying in vacuo was identified as diphenylurea (5.36 g.; 20.7% yield). The filtrate, which contained some unreacted nitrobenzene, was distilled and gave 13.06 g. of pure aniline (57.5% yield).

Example 9

$Ru_3(CO)_{12}$ (0.238 g.; 0.372 mmole) was dissolved in 30.10 g. nitrobenzene (244 mmoles, ratio nitrobenzene:ruthenium=219) and reacted with 20 atm. $H_2$ (ca. 146 mmoles) and 140 atm. CO (ca. 1020 mmoles). This represents a hydrogen to CO ratio of 1:7. The reaction time was 4.4 hrs. The pressure drop after cooling was 70 atm. The diphenylurea obtained was 10.45 g. (40.4% yield) and the quantity of distilled aniline was 8.98 g. (39.5% yield).

Example 10

$Ru_3(CO)_{12}$ (0.230 g.; 0.360 mmole) was dissolved in 30.10 g. nitrobenzene (244 mmoles, ratio nitrobenzene:ruthenium=226) and reacted with 12 atm. $H_2$ (ca. 87 mmoles) and 148 atm. CO (ca. 1078 mmoles). This represents a hydrogen to CO ratio of 1:12.3. The reaction time was 21 hrs. After cooling a pressure drop of 42 atm. was observed. 14.02 g. of pure diphenylurea was isolated, 54.1% yield. The yield of aniline was not determined. The infrared spectrum of the filtrate indicated, however, the presence of considerable amounts of unreacted nitrobenzene.

Example 11

Ru$_3$(CO)$_{12}$ (0.352 g.; 0.551 mmole) was dissolved in 30.10 g. nitrobenzene (244 mmoles, ratio nitrobenzene:ruthenium=148) and reacted with 200 atm. CO (ca. 1460 mmoles). The reaction time was 21.3 hrs. After cooling a pressure drop of 10 atm. was observed. The reaction mixture was filtered. 2.19 g. of pure diphenylurea was isolated, 8.5% yield. Apart from some bands of ruthenium carbonyls in the region around 2000 cm.$^{-1}$, the infrared spectrum of the filtrate was that of pure nitrobenzene.

Example 12

Ru$_3$(CO)$_{12}$ (0.302 g.; 0.472 mmole) was dissolved in 75 ml. ethanol and 30.10 g. nitrobenzene (244 mmoles, ratio nitrobenzene:ruthenium=172) was added to this solution, which was then heated under 200 atm. CO (ca. 1460 mmoles) at 160° for 17 h., 30 min. After cooling a pressure drop of 95 atm. was observed. After evaporation of the ethanol, the reaction mixture was distilled in vacuo. 10.63 g. aniline was obtained (46.8% yield). The brown residue of distillation was then chromatographed on silica gel and 8.71 g. of N-phenylethylcarbamate (21.6% yield) was obtained, M.P. 50°, lit. 52°.

The results of Examples 8, 9 and 10 show that while with lower H$_2$:CO ratios the yield of diphenylurea increases while that of aniline decreases, there are still amounts of aniline produced which are in general higher than the amounts of diphenylurea. This makes it very probable that the addition of CO to the intermediate phenylnitrene is at a lower rate than the addition of H$_2$. This is somewhat surprising as the rates of addition should not be greatly different since aniline and diphenylurea coexist. The reason for the somewhat anomalous results has not been definitely determined. Example 11, which shows that the major part of the nitrobenzene was unreduced, did produce a small amount of diphenylurea. This may have been due to the presence of small amounts of hydrogen in the commercial carbon monoxide which was used. Once this is used up, the reaction apparently stops, which accounts for the large amount of unreacted nitrobenzene. The same example also indicates that while carbon monoxide is probably the reducing agent in the first two steps to produce the phenylnitrene, there may be some portion of the ruthenium carbonyl catalyst which, transiently at least, contains some hydrogen. Example 12 produced substantial amounts of aniline even though there was no significant amount of hydrogen in the carbon monoxide used. Presumably the hydrogen was obtained from the alcohol solvent.

Example 13

2-nitropropane (0.1 mole) dissolved in 50 ml. benzene was introduced in a stainless steel autoclave together with 0.109 g. (0.171 mmole) of Ru$_3$(CO)$_{12}$. Carbon monoxide and hydrogen in a ratio 1:4 were then pumped in up to a total pressure of 200 atmospheres. The autoclave was heated to 150° for 17 hours. A gas-chromatographic analysis of the filtered reaction mixture showed that isopropylamine was produced.

Example 14

7.71 g. (25 mmoles) of N,N-dipropionamido-4-nitrobenzamide dissolved in 50 ml. benzene was introduced in a stainless steel autoclave together with 0.110 g. (0.172 mmole) of Ru$_3$(CO)$_{12}$. Carbon monoxide and hydrogen in a ratio of 1:2 were pumped in to a total pressure of 150 atmospheres and the autoclave was then heated to 160° C. for 15 hours. The crude reduced compound was collected by filtration and dried in vacuo (91% yield). After extraction with acetone and drying in vacuo, the substance melted at 203–205° C. and analyzed correctly for N,N-dipropionamido-4-aminobenzamide.

*Analysis.*—Calcd. for C$_{13}$H$_{18}$N$_4$O$_3$ (percent): C, 56.10; H, 6.52; N, 20.13. Found (percent): C, 56.2; H, 6.7; N, 19.80.

Example 15

2,4-dinitrotoluene (9.11 g. 50 mmoles) was dissolved in 50 ml. benzene and introduced in a stainless steel autoclave together with 0.096 g. (0.151 mmole) of Ru$_3$(CO)$_{12}$. Carbon monoxide and hydrogen in a ratio 1:3 were pumped up to a total pressure of 180 atmospheres. The autoclave was then heated at 160° C. for 23 hours. After cooling and filtration, the infrared analysis of the soluble products indicated the presence of 2,4-diaminotoluene and very little unreacted 2,4-dinitrotoluene. The solid substance (76% yield) was filtered and found to have an infrared spectrum substantially identical to that of an authentic sample of the diamine.

Example 16

4,4',4''-trinitro-triphenylamine (9.51 g., 25 mmoles) dissolved in 50 ml. benzene was introduced in a stainless steel autoclave together with 0.176 g. (0.275 mmole) of Ru$_3$(CO)$_{12}$. Carbon monoxide and hydrogen in a ratio 1:3.2 were then pumped in up to a total pressure of 170 atmospheres. The autoclave was heated at 160° C. for 16 hours. After cooling, it was observed that a considerable gas absorption had occurred. The gases were vented and the autoclave content was filtered and dried in vacuo. The crude reduction product (6.17 g., 85% yield, M.P. 223–229° C.) was purified by dissolution in 0.1 N HCl, filtration, reprecipitation with 5 N NaOH and drying in vacuo. The so obtained product had the characteristic color reactions of 4,4',4''-tri-amino-triphenylamine (C. Heydrich, Chem. Ber., 18, 2157 (1885)) and melted at 232–235° C. (lit. 230° C.).

We claim:

1. A process of catalytic reduction of the nitro group of an organic compound having a nitro group available for reduction to an amino group, which comprises heating said organic nitro compound in an atmosphere comprising carbon monoxide and hydrogen in amounts sufficient to effect reduction of the nitro group to amino in presence of a catalytic amount of a ruthenium carbonyl at reaction temperature in the range from about 100° C. to about 160° C. and at pressure in the range from about 100 to about 300 atmospheres.

2. A process according to claim 1 in which the ratio of hydrogen to carbon monoxide is about 1:1.

3. A process according to claim 1 in which the ratio of the moles of nitro compound to ruthenium atoms in the catalyst is at least about 100.

4. A process according to claim 1 in which an inert diluent liquid is added to the reaction mixture in amount sufficient to maintain exotherm below that at which charred products are produced.

5. A process according to claim 1 in which the ruthenium carbonyl catalyst is dodecacarbonyltriruthenium.

6. A process according to claim 1 in which the nitro compound is nitrobenzene and it is reduced to aniline.

References Cited

UNITED STATES PATENTS 3,177,258    4/1965    Rylander et al. _____ 260—580 X

LEWIS GOTTS, Primary Examiner

R. L. RAYMOND, Assistant Examiner

U.S. Cl. X.R.

260—558 A, 563 D, 583 M